(12) United States Patent
Dumas et al.

(10) Patent No.: US 12,407,821 B2
(45) Date of Patent: Sep. 2, 2025

(54) IMPROVING THE ANGLE DISCRETIZATION IN DECODER SIDE INTRA MODE DERIVATION

(71) Applicant: INTERDIGITAL CE PATENT HOLDINGS, SAS, Paris (FR)

(72) Inventors: Thierry Dumas, Rennes (FR); Fabrice Le Leannec, Betton (FR); Franck Galpin, Thorigne-Fouillard (FR); Philippe Bordes, Laille (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 18/691,191

(22) PCT Filed: Sep. 16, 2022

(86) PCT No.: PCT/EP2022/075843
§ 371 (c)(1),
(2) Date: Mar. 12, 2024

(87) PCT Pub. No.: WO2023/052156
PCT Pub. Date: Apr. 6, 2023

(65) Prior Publication Data
US 2024/0380885 A1    Nov. 14, 2024

(30) Foreign Application Priority Data
Sep. 28, 2021 (EP) .................................. 21306345

(51) Int. Cl.
*H04N 19/11*     (2014.01)
*H04N 19/105*    (2014.01)
(Continued)

(52) U.S. Cl.
CPC .......... *H04N 19/11* (2014.11); *H04N 19/105* (2014.11); *H04N 19/176* (2014.11); *H04N 19/593* (2014.11)

(58) Field of Classification Search
None
See application file for complete search history.

(56) References Cited

PUBLICATIONS

Mora et al., CE3: Decoder-side Intra Mode Derivation (tests 3.1.1, 3.1.2, 3.1.3 and 3.1.4), 125. MPEG Meeting, Jan. 14, 2019-Jan. 18, 2019, Marrakech, (Motion Picture Expert Group ISO/IEC JTC1/SC29/WG11), No. m45351, (2019), Document: JVET-M0094.
(Continued)

*Primary Examiner* — Chikaodili E Anyikire
(74) *Attorney, Agent, or Firm* — Ronald Kolczynski

(57) ABSTRACT

Decoder side intra mode derivation (DIMD) capability is enhanced by using reference pixels that extend several rows above and several columns left of a current video block, and also includes pixels above and left of the current video block, as well as columns above and right and rows below and left of the current video block. The reference pixels are formed from surrounding reconstructed/previously encoded samples surrounding the current video block. The derivation of an intra prediction mode is determined from gradients determined from each of the reference pixels in a defined surrounding area. In one embodiment, the gradients are determined using horizontal and vertical filters. In a sub-embodiment, the filters do not extend beyond the defined surrounding area. In another embodiment, reassignment of an index indicative of the target intra prediction mode is performed.

20 Claims, 24 Drawing Sheets

(51) Int. Cl.
    *H04N 19/176*    (2014.01)
    *H04N 19/593*    (2014.01)

(56)    References Cited

PUBLICATIONS

Abdoli et al., Non-CE3: Decoder-side Intra Mode Derivation with Prediction Fusion, Joint Video Experts Team (JVET) of ITU-T SG 16 WP 3 and ISO/IEC JTC 1/SC 29/WG 11, Document: JVET-N0342, 14th Meeting, Geneva, Switzerland, Mar. 19, 2019, 6 pages.
Abdoli et al., Decoder-side intra mode derivation for next-generation video coding, 2020 IEEE International Conference on Multimedia and Expo (ICME), London, United-Kingdom, Jul. 6, 2020, 6 pages.
Guo et al., Direction based Angular Intra Prediction, Joint Collaborative Team on Video Coding, JCT-VC) of ITU-T SG16 WP3 and ISO/IEC JTC1/SC29/WG11, Document: JCTVC-F122, 6th Meeting: Torino, Italy, Jul. 14-22, 2011.
Xiu et al., EE8: Decoder-Side Intra Mode Derivation, 4. JVET Meeting, Oct. 15, 2016-Oct. 21, 2016, Chengdu, (The Joint Video Exploration Team of ISO/IEC JTC1/SC29/WG11 and ITU-T SG. 16), No. JVET-D0097 r3, 2016, pp. 1-7.
Nasrallah, et al., Decoder-Side Intra Mode Derivation With Texture Analysis in VVC Test Model, ICIP, (2019), pp. 3153-3157.
Abdoli, et al., Non-CE3: Decoder-side Intra Mode Derivation (DIMD) With Prediction Fusion Using Planar, 15. JVET Meeting, Jul. 3, 2019-Jul. 12, 2019, Gothenburg, (The Joint Video Exploration Team of ISO/IEC JTC1/SC29/WG11 and ITU-T SG.16), No. JVET-O0449-v2, m48570 (2019).

IMPROVING THE ANGLE DISCRETIZATION IN DECODER SIDE INTRA MODE DERIVATION

CROSS REFERENCE TO RELATED APPLICATIONS

This application is a U.S. National Stage Application under 35 U.S.C. 371 of International Patent Application No. PCT/EP2022/075843, filed Sep. 16, 2022, which is incorporated herein by reference in its entirety.

This application claims the benefit of European Application Nos. 21306345.6, filed Sep. 28, 2021, which is incorporated herein by reference in its entirety.

TECHNICAL FIELD

At least one of the present embodiments generally relates to a method or an apparatus for video encoding or decoding, compression or decompression.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

At least one of the present embodiments generally relates to a method or an apparatus for video encoding or decoding, and more particularly, to a method or an apparatus for improving the coding efficiency of decoder side intra mode derivation from surrounding reference pixels.

According to a first aspect, there is provided a method. The method comprises steps for determining one or more gradients for reference pixels surrounding a current video block; determining an intra prediction mode to use for encoding the current video block based on said gradients; and, encoding the current video block using the determined intra prediction mode.

According to a second aspect, there is provided another method. The method comprises steps for determining one or more gradients for reference pixels surrounding a current video block; determining an intra prediction mode to use for encoding the current video block based on said gradients; and, decoding the current video block using the determined intra prediction mode.

According to another aspect, there is provided an apparatus. The apparatus comprises a processor. The processor can be configured to encode a block of a video or decode a bitstream by executing any of the aforementioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

DETAILED DESCRIPTION

The general aspects described herein relate to the Decoder Side Intra Mode Derivation (DIMD), which is an intra prediction tool for block-based video coding. This section first introduces the key intra prediction tools in WVC (currently one of the top block-based video codecs in terms of compression performance). Then, it presents DIMD and its formulation in the ECM (Enhanced Compression Model) software. ECM is developed at JVET to show improved compression performance over WVC. Finally, problems regarding the context and the angle discretization in DIMD are pointed out.

Core Intra Prediction in VVC, Inherited from HEVC

For a given block to be predicted, the intra prediction in WVC consists of gathering decoded reference samples, propagating the decoded reference samples into the predicted block, and finally post-processing the samples of the predicted block.

Figure 1:
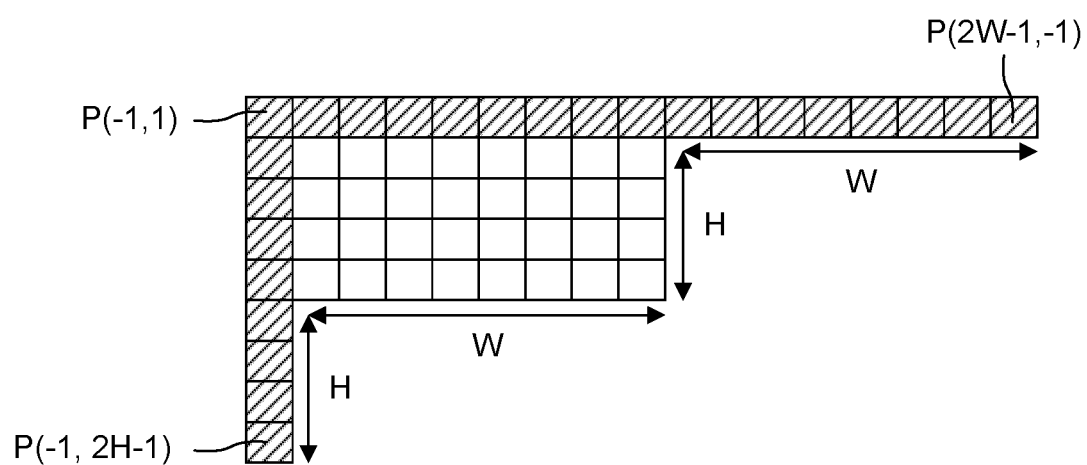
FIG. 1 illustrates decoded reference samples for intra prediction in WVC (Versatile Video Coding).

The generation of the decoded reference samples is illustrated in FIG. 1, which shows decoded reference samples for intra prediction in VVC in the case of a W×H block to be predicted. The decoded reference sample value at coordinates (x, y) is indicated by P (x, y). Note that the coordinate system conventionally used in video compression is used, i.e., in (x, y), x denotes the pixel column and y denotes the pixel row. The W×H block to be predicted is displayed in white while its decoded reference samples are shown in gray. Here, H=4 and W=8. An "above" row of 2 W samples is formed from the previously decoded pixels located above the current block, W denoting the block width. Similarly, a "left" column of 2H samples is formed from the decoded pixels located on the left side of the current block, H denoting the block height. The corner pixel is also used to fill up the gap between the "above" row and the "left" column references. If some of the samples above the current block and/or on its left side are not available, a method called reference sample substitution is performed where the missing samples are copied from the available samples in a clockwise direction. Next, depending on the current Coding Unit (CU) size and the used intra prediction mode, the reference samples are filtered using a specified filter.

Models of the Core Intra Prediction

Figure 2:
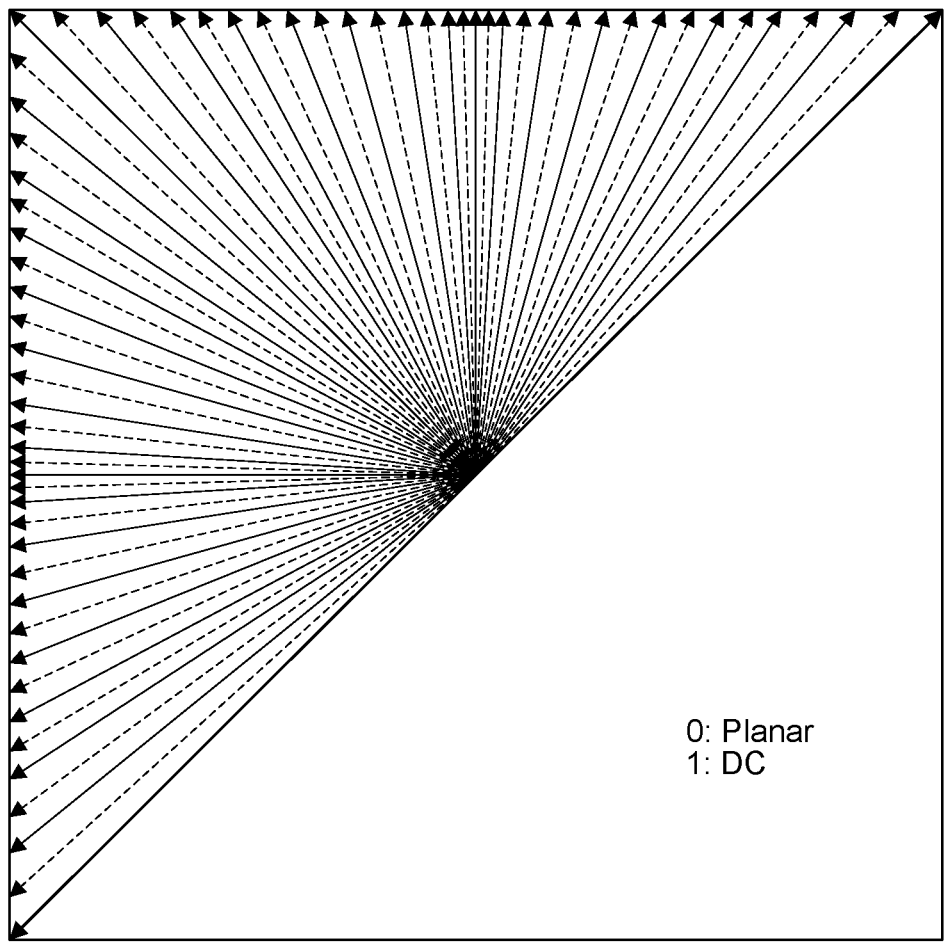
FIG. 2 illustrates core intra prediction modes in VVC for a square block to be predicted.

VVC includes a range of linear models for intra prediction, called intra prediction modes. Each mode propagates the decoded reference samples into the predicted block in a different manner. PLANAR and DC modes predict smooth and gradually changing regions. In contrast, the directional modes capture directional structures. There exist 65 directional intra prediction modes in VVC, see FIG. 2, which are organized differently for each rectangular block shape. FIG. 2 shows core intra prediction modes in VVC for a square block to be predicted. Each arrow represents the direction of propagation of the decoded reference samples into the predicted block associated to a different directional intra prediction mode. Half of the arrows are associated to the directional intra prediction modes existing in HEVC. The remaining arrows are associated to the directional intra prediction modes that do not exist in HEVC but additionally exist in VVC.

Intra Prediction Tools Specific to VVC

The two key intra prediction tools specific to VVC appear to be Matrix-based Intra Prediction (MIP) and Cross-Component Linear Models (CCLM) for two reasons. Firstly, MIP and CCLM seem to be the two pure intra prediction tools yielding the largest gains in terms of compression performance from HEVC to VVC. Secondly, MIP and CCLM introduce new intra prediction modes whereas the other intra prediction tools specific to VVC, called Multiple Reference Lines, Intra Sub-Partition, and Position-Dependent Prediction Combination, can be viewed as variant of the intra prediction modes described in an earlier section. Specifically, MIP appear to be more relevant in this description. Indeed, DIMD, the main topic here, does not directly interaction with CCLM as, in the literature, DIMD and MIP are used for luminance blocks, whereas CCLM is classified as chrominance-only tool.

Matrix-Based Intra Prediction (MIP)

MIP consists in linear intra prediction modes with learned matrices fixed on both the encoder and decoder sides.

The prediction of a W×H luminance block via MIP mode is decomposed into three steps. First, the W decoded reference samples above the block and the H decoded reference samples on its left side are downsampled. Then, the result of the downsampling is linearly transform into a reduced prediction. Finally, if needed, the reduced prediction is linearly interpolated such that the interpolated prediction has the same size as the W×H luminance block.

Figure 3:
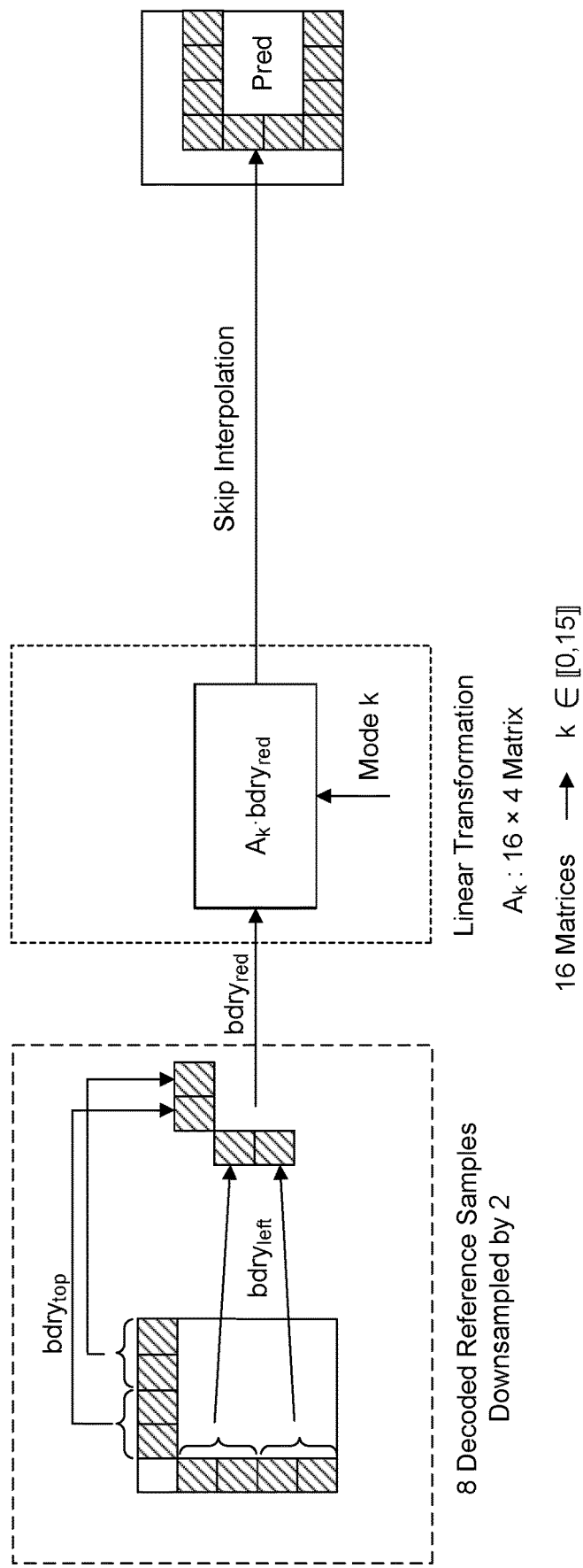
FIG. 3 illustrates prediction of a 4×4 luminance block via the MIP mode of index $k \in [[0, 15]]$.
Figure 4:
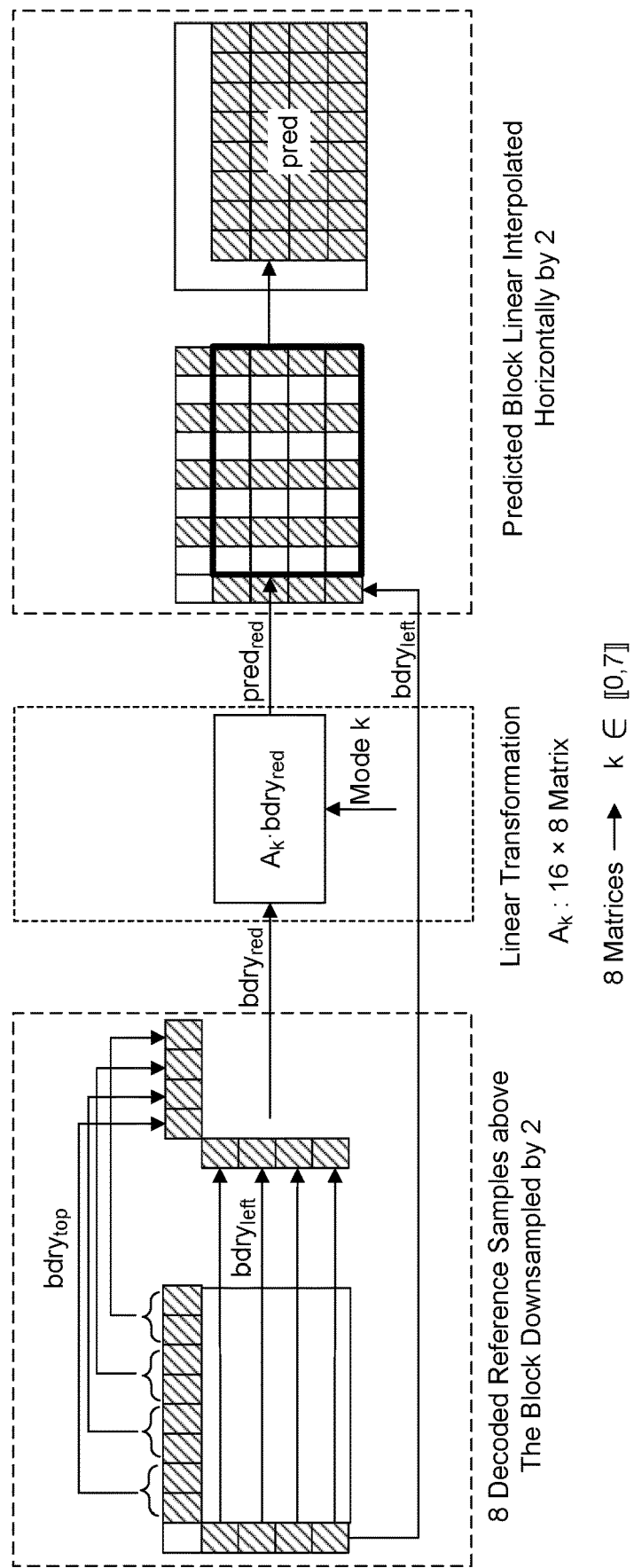
FIG. 4 illustrates prediction of a 8×4 luminance block via the MIP mode of index $k \in [[0,7]]$.

More precisely, if W=4 and H=4, the downsampling factor is 2. Besides, the MIP matrix in the linear transform has size 16×4 (4 input samples and 16 output samples), see FIG. 3. If either W=4 and H=8 or W=8 and H=4 or W=8 and H=8, the downsampling factor for the W decoded reference samples is W/4, and the downsampling factor for the H decoded reference samples is H/4. Besides, the MIP matrix in the linear transform has size 16×8 (8 input samples and 16 output samples), see FIG. 4. For all the other block sizes, the downsampling factor for the W decoded reference samples is W/4 and the downsampling factor for the H decoded reference samples is H/4. Besides, the MIP matrix in the linear transform has size 64×8 (8 input samples and 64 output samples). Note that, for the interpolation step, a horizontal interpolation of the reduced prediction uses some of the H decoded reference samples, not their downsampled version. A vertical interpolation of the reduced prediction uses some of the W decoded reference samples, not their downsampled version.

Figure 5:
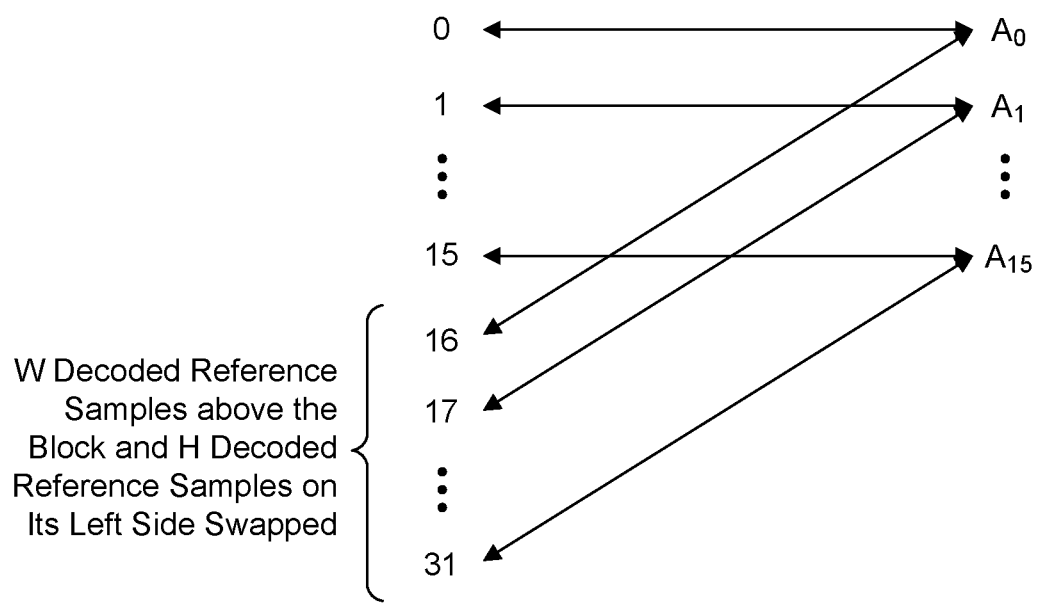
FIG. 5 illustrates mapping from the index of the MIP mode to the index of the MIP matrix for a 4×4 luminance block to be predicted.
Figure 6:
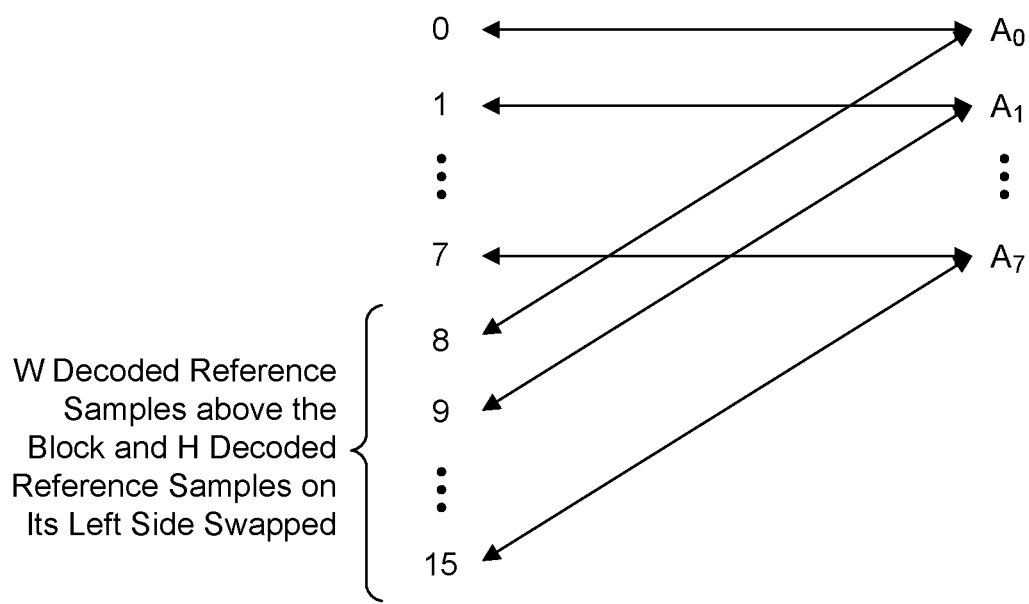
FIG. 6 illustrates mapping from the index of the MIP mode to the index of the MIP matrix for an 8×4 luminance block to be predicted.

If W=4 and H=4, there exist 32 MIP modes. These modes are split into pairs, each pair using the same MIP matrix, but, for the second mode of each pair, the downsampled reference samples above the luminance block and the downsampled reference samples on its left side are swapped. The mapping from the MIP mode index to the MIP matrix index is depicted in FIG. 5. When the swap of the downsampled reference samples applies, the reduced prediction is transposed before being interpolated. If W=4 and H=8 or W=8 and H=4 or W=8 and H=8, there are 16 MIP modes and the mode pairing still applies, see FIG. 6. For all the other block sizes, 12 MIP modes are used and the mode pairing still applies.

Decoder Side Intra Mode Derivation (DIMD)

DIMD relies on the assumption that the decoded pixels surrounding a given block to be predicted carries information to infer the texture directionality in this block, i.e., the intra prediction modes that most likely generate the predictions with the highest qualities. This section first explains the DIMD process. Then, it focuses on the issues related to the context and the angle discretization in DIMD. Note that, as pointed out earlier, all the explanations apply the same way on both the encoder and decoder sides.

Inference in DIMD

The inference of the indices of the intra prediction modes that most likely generate the predictions of highest qualities according to DIMD is decomposed into three steps. First, gradients are extracted from a context of decoded pixels around a given block to be predicted. Then, these gradients are used to fill a Histogram of Oriented Gradients (HOG). Finally, the indices of the intra prediction modes that most likely give the predictions with highest qualities are derived from this HOG, and a blending can be performed.

Extraction of Gradients from the Context

Figure 7:
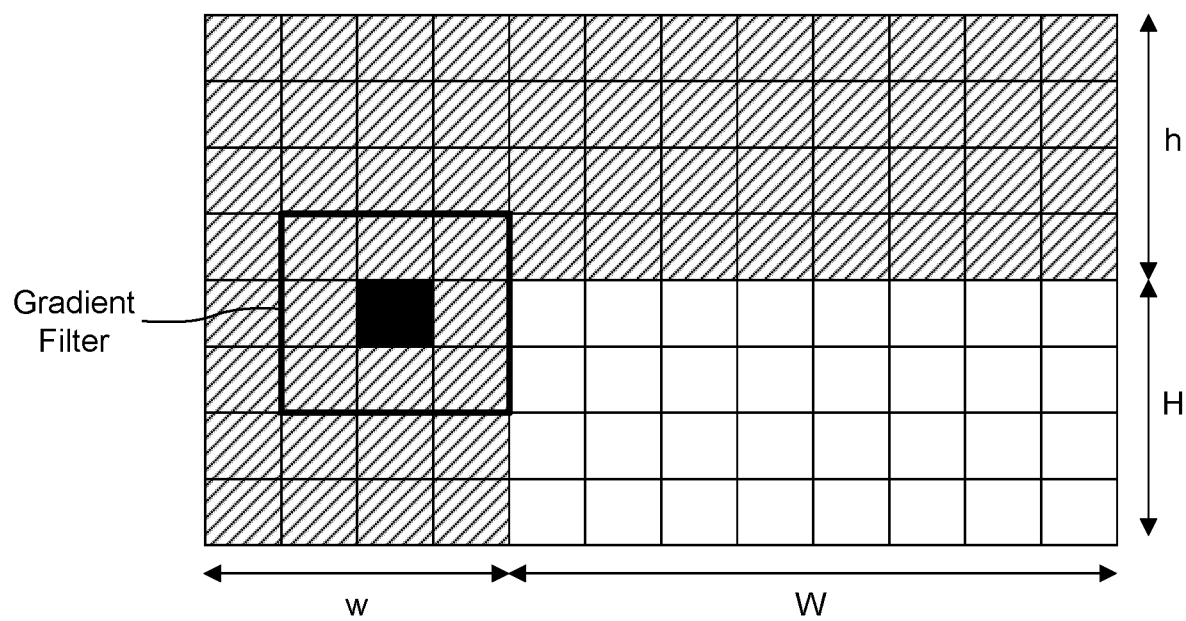
FIG. 7 illustrates extraction of gradients from the context of a W×H block to be predicted.

For a given block to be predicted, a L-shape context of h rows of decoded pixels above this block and w columns of decoded pixels on the left side of this block is considered, see FIG. 7 which shows extraction of the gradients from the context of a W×H block to be predicted. The block to be predicted is displayed in white. The context of this block is displayed in gray. The context contains h rows of decoded pixels located above the block and w columns of pixels located on the left side of the block. The gradient filter is framed in black. At each decoded pixel of interest in this context, a local vertical gradient and a local horizontal gradient are computed. In prior works, the local vertical and horizontal gradients are computed via 3×3 vertical and horizontal Sobel filters. Moreover, in prior methods, a decoded pixel of interest in this context refers to a decoded pixel at which the gradient filter does not go out of the context bounds. Therefore, in those works, the complete extraction of gradients can be summarized by the "valid" convolution of the 3×3 vertical and horizontal Sobel filters with the context.

Filling the Histogram of Oriented Gradients (HOG)

In the HOG, each bin is associated to the index of a different directional intra prediction mode. At initialization, all the HOG bins are equal to 0. For each decoded pixel of interest at which the local vertical gradient $G_{VER}$ and the local horizontal gradient $G_{HOR}$ are computed, a direction is derived from $G_{VER}$ and $G_{HOR}$, and the bin associated to the index of the directional intra prediction mode whose direction is the closest to the derived direction is incremented. This index is called the "target intra prediction mode index".

More precisely, for a given decoded pixel of interest, the derivation of the direction from $G_{VER}$ and $G_{HOR}$ is based on the following observation. During the prediction of a block via a directional intra prediction mode, the largest gradient in absolute value usually follows perpendicular to the mode direction. Therefore, the direction derived from $G_{VER}$ and $G_{HOR}$ must be perpendicular to the gradient of components $G_{VER}$ and $G_{HOR}$. For instance, in the framework of ECM using the 65 VVC directional intra prediction modes, considering vertical and horizontal gradient filters for which the direction of positive vertical gradient goes from top to bottom and the direction of positive horizontal gradient goes from right to left, the mapping from the absolute values of $G_{VER}$ and $G_{HOR}$ and the signs of $G_{VER}$ and $G_{HOR}$ to the range of the target intra prediction mode index is displayed in FIG. 8.

Now, if $|G_{VER}|>|G_{HOR}|$, the reference axis is the horizontal axis. Otherwise, the reference axis is the vertical axis. The angle θ between the reference axis and the direction being perpendicular to the gradient G of components $G_{VER}$ and $G_{HOR}$ is given by $\tan(\theta)=|G_{HOR}|/|G_{VER}|$ if $|G_{VER}|>|G_{HOR}|$, $\tan(\theta)=|G_{VER}|/|G_{HOR}|$ otherwise, see FIG. 9 and FIG. 10.

Figure 8:
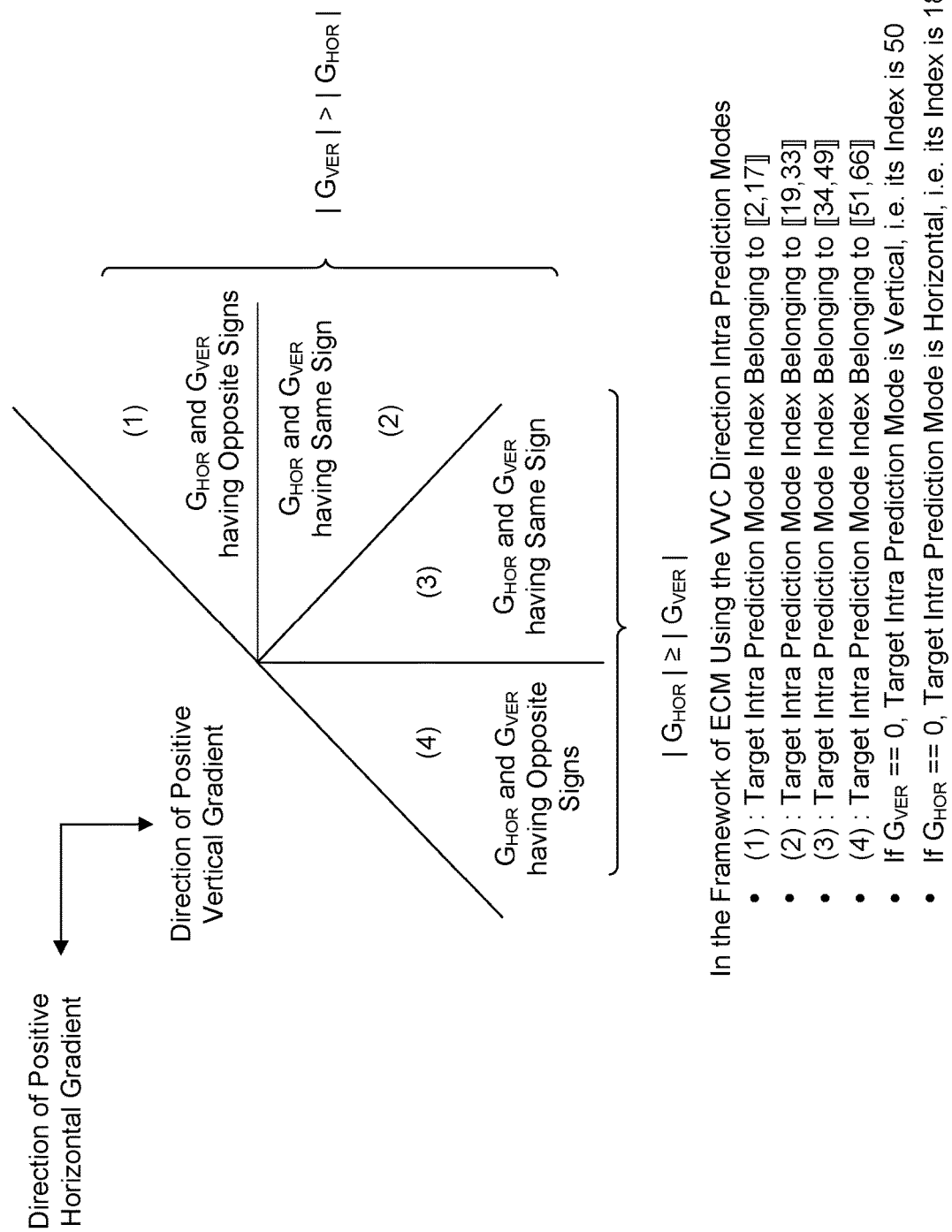
FIG. 8 illustrates identification of the range of the target intra prediction mode index from the absolute values of $G_{VER}$ and $G_{HOR}$ and the signs of $G_{VER}$ and $G_{HOR}$.

For the current decoded pixel of interest at which the local vertical gradient $G_{VER}$ and the local horizontal gradient $G_{HOR}$ are computed, for the range of intra prediction mode indices found as in FIG. 8, it is now possible to find the index of the intra prediction mode whose angle with respect to the reference axis is the closest to θ. The bin associated to the index of the found target intra prediction mode is then incremented by $|G_{HOR}|+|G_{VER}|$. This means that, by denoting H the HOG and i the bin associated to the index of the found target intra prediction mode, $H[i]=H[i]+|G_{HOR}|+|G_{VER}|$.

Note that, for the current decoded pixel of interest, if $G_{HOR}=G_{VER}=0$, no bin in the HOG is incremented.

Inference of the Intra Prediction Mode(s)

Once the filling of the HOG is completed, the index of the directional intra prediction mode that most likely generates the prediction with the highest quality is the one associated to the bin of largest magnitude. In some variants of DIMD, the two bins with the largest magnitudes are identified to find indices of the directional intra prediction modes that most likely yield the two predictions with the highest qualities according to DIMD, and these two modes are linearly combined, optionally with PLANAR.

Signaling of DIMD in ECM

In ECM, for a given luminance Coding Block (CB) to be predicted, DIMD is signaled via a DIMD flag, placed first in the decision tree of the signaling of the intra prediction mode selected to predict this luminance CB, i.e., before the Template-Matching Prediction flag and the MIP flag.

Issues Related to DIMD

Limited Extended of the Context

For a given block to be predicted, the context, in its common design, includes no decoded pixels on the above-right side of this block and no decoded pixels on its bottom-left side. Yet, depending on the size of the current Coding Unit (CU), its position within its current Coding Tree Unit (CTU), and its position within the current frame, decoded pixels on the above-right side of this block and/or its bottom-left side may be available. If most of the relevant intensity gradients are located on the above-right side of this block and/or on its bottom-left side, the fact that these decoded pixels are not included in the context can be viewed as a critical loss of available information.

Discontinuities in the Angle Discretization

In the common implementations of DIMD, like the one in file "IntraPrediction.cpp" in the ECM-2.0 software, for a given decoded pixel at which the local vertical gradient $G_{VER}$ and the local horizontal gradient $G_{HOR}$ are computed, for the found range of the target intra prediction mode index, see FIG. 8, the angle θ is not directly compared to the angle of each intra prediction mode with respect to the reference axis in this range. Indeed, in VVC and ECM, the absolute angle of each intra prediction mode with respect to its reference axis is stored in a scaled integer form. Therefore, $\dot{\theta}=\text{floor}(\tan(\theta) \times (1<<16))$ is compared to the scaled integer form $A_i$ of the angle of the directional intra prediction mode of index i from the reference axis, $i \in [|0, 16|]$. The function floor denotes the floor operation. Then, the absolute shift i* from the index of the reference axis to the index of the target intra prediction mode is $$i^* = \min_i |A_i - \dot{\theta}|.$$

Figure 9:
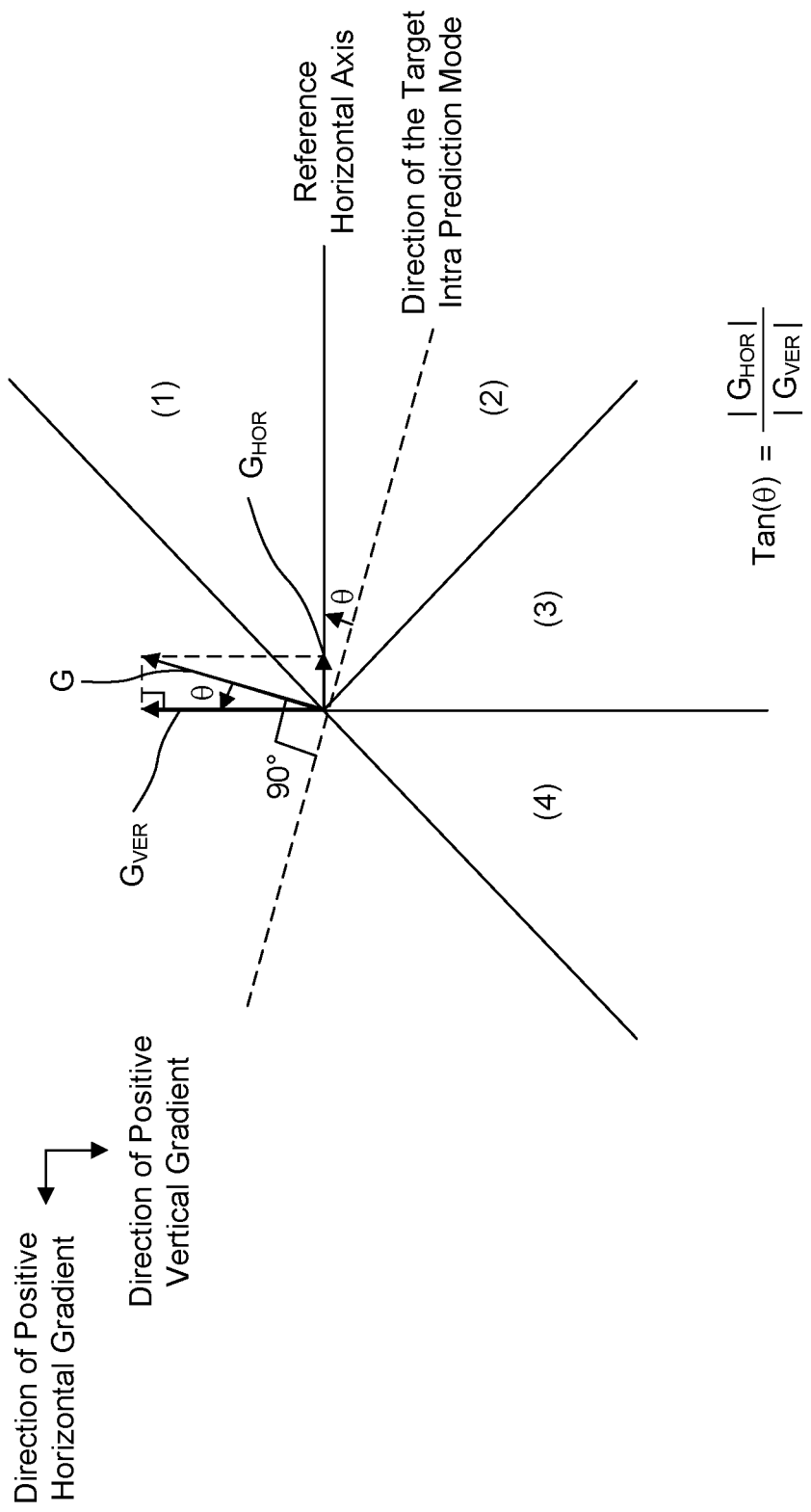
FIG. 9 illustrates computation of the angle θ between the reference axis and the direction being perpendicular to the gradient G of components $G_{VER}$ and $G_{HOR}$ when $|G_{VER}| > |G_{HOR}|$. Note that, here, $G_{VER} < 0$ and $G_{HOR} < 0$.
Figure 10:
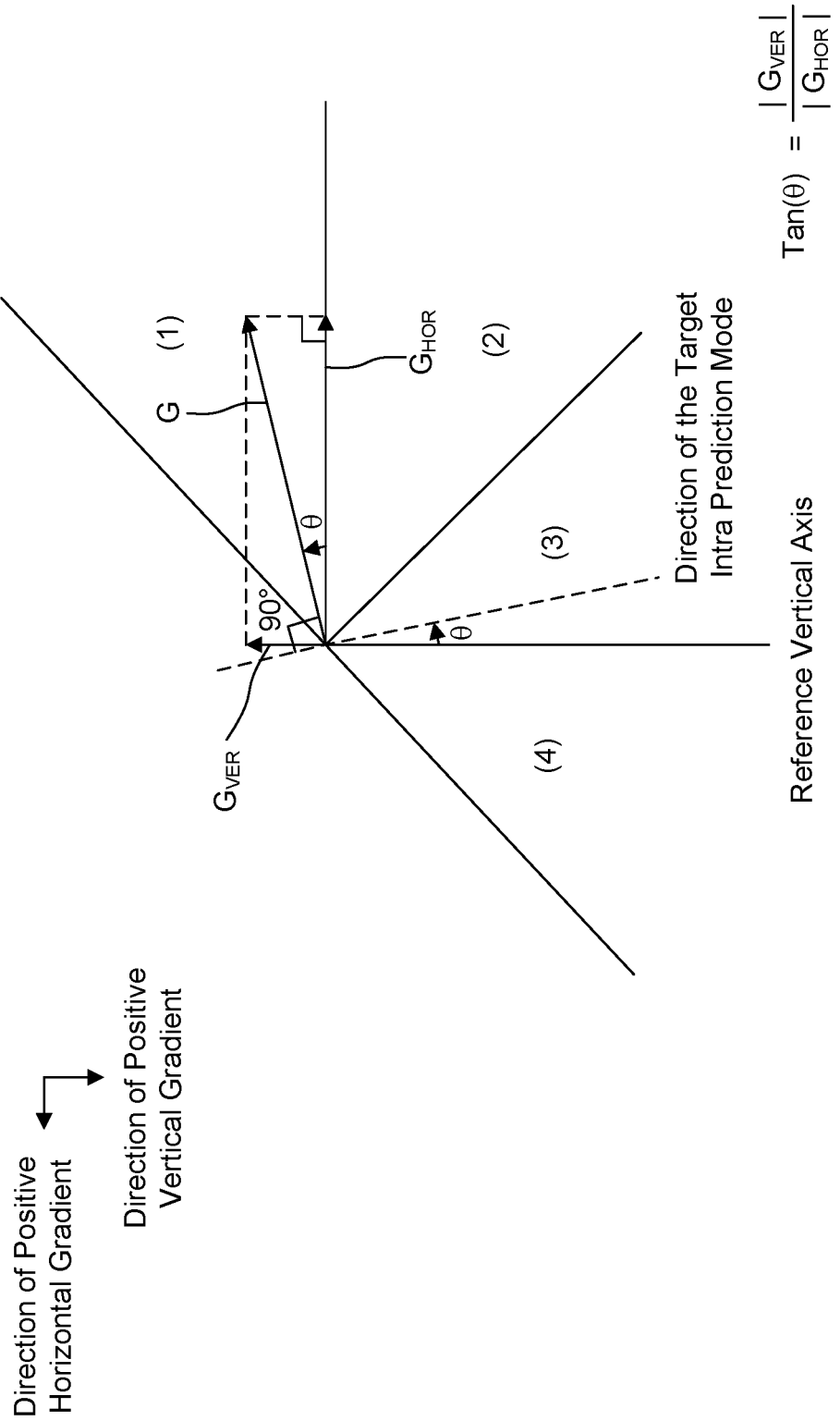
FIG. 10 illustrates computation of the angle θ between the reference axis and the direction being perpendicular to the gradient G of components $G_{VER}$ and $G_{HOR}$ when $|G_{HOR}| \geq |G_{VER}|$. Note that, here, $G_{VER} < 0$ and $G_{HOR} < 0$.
Figure 11:
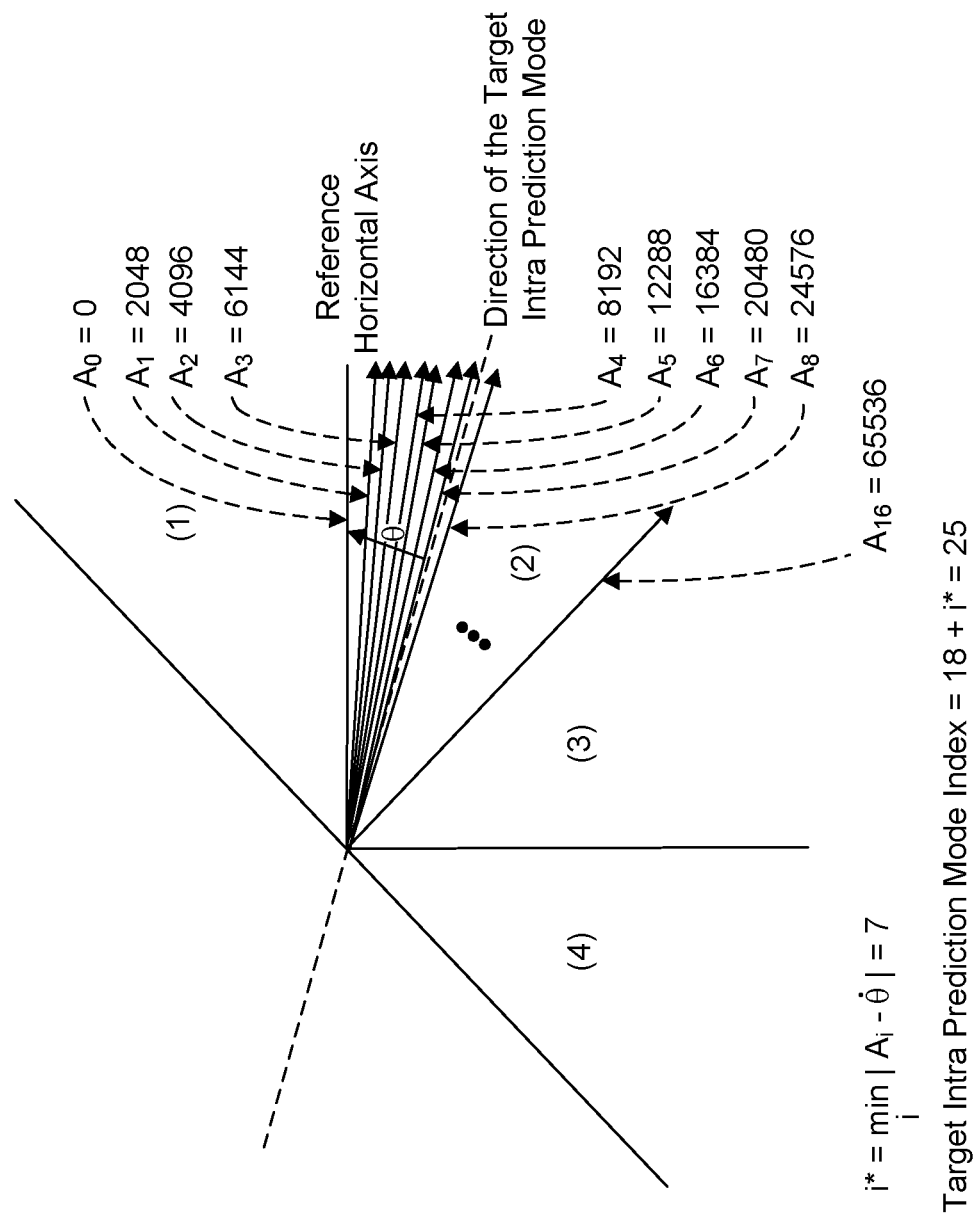
FIG. 11 illustrates computation of the index of the target intra prediction mode index in the conditions of FIG. 9, i.e. $|G_{VER}| > |G_{HOR}|$. Note that, here, $G_{VER} < 0$ and $G_{HOR} < 0$.
Figure 12:
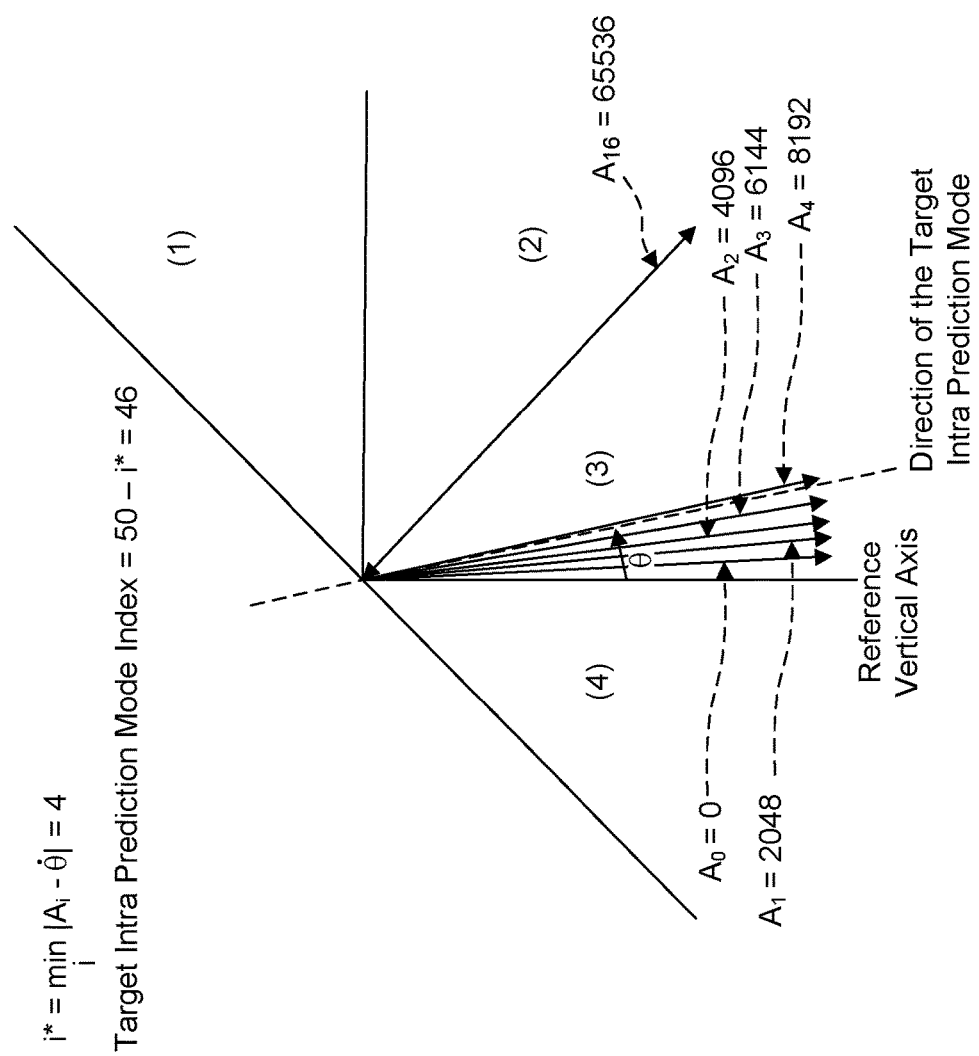
FIG. 12 illustrates computation of the index of the target intra prediction mode index in conditions of FIG. 10, i.e., when $|G_{HOR}| \geq |G_{VER}|$. Note that, here, $G_{VER} < 0$ and $G_{HOR} < 0$.

The target intra prediction mode index is finally equal to the index of the reference axis shifted by i*. In the conditions of FIG. 9, FIG. 11 illustrates the computation of the index of the target intra prediction mode using the above-mentioned discretization of θ. In the conditions of FIG. 10, FIG. 12 presents the computation of the index of the target intra prediction mode using the above-mentioned discretization of θ.

In the common implementations of DIMD, like the one in file "IntraPrediction.cpp" of the ECM-2.0 software, if $|G_{HOR}|=|G_{VER}|$, i.e. $\dot{\theta}$ is exactly equal to 65536, the minimization $$i^* = \min_i |A_i - \dot{\theta}|$$

is skipped, and i*=−1. As a consequence, in the case where $|G_{HOR}|$ and $|G_{VER}|$ have the same sign, the index of the target intra prediction mode is equal to 51. In the case where $|G_{HOR}|$ and $|G_{VER}|$ have opposite signs, the target intra prediction mode index is equal to 49. This appears to be a clear discontinuity in the rule to compute the target intra prediction mode index.

The general aspects in this description aim to fix the limited extent of the DIMD context and the discontinuities in the angle discretization.

Regarding the limited extent of the DIMD context, it is proposed to extend the DIMD context towards the above-right side of the current block and its bottom-left side.

Regarding the discontinuities in the angle discretization, in the case where $|G_{HOR}|=|G_{VER}|$, i.e. $\dot{\theta}$ is equal to its maximum value, e.g. 65536, in the current implementation of ECM-2.0, $\dot{\theta}$ is considered as the closest to the maximum $A_i$. Thus, in the current implementation of ECM-2.0, i*=16.

Extension of the DIMD Context

For a given W×H block to be predicted, the DIMD context can be extended towards the above-right side of this block and its bottom-left side. In examples, the extension towards the above-right side of this block can cover as many available decoded pixels as possible, in the limit of W additional columns of decoded pixels. The extension towards the bottom-left side of this block can cover as many available decoded pixels as possible, in the limit of H additional rows of decoded pixels, see FIG. 13, FIG. 14, FIG. 15, FIG. 16, and FIG. 17.

Figure 13:
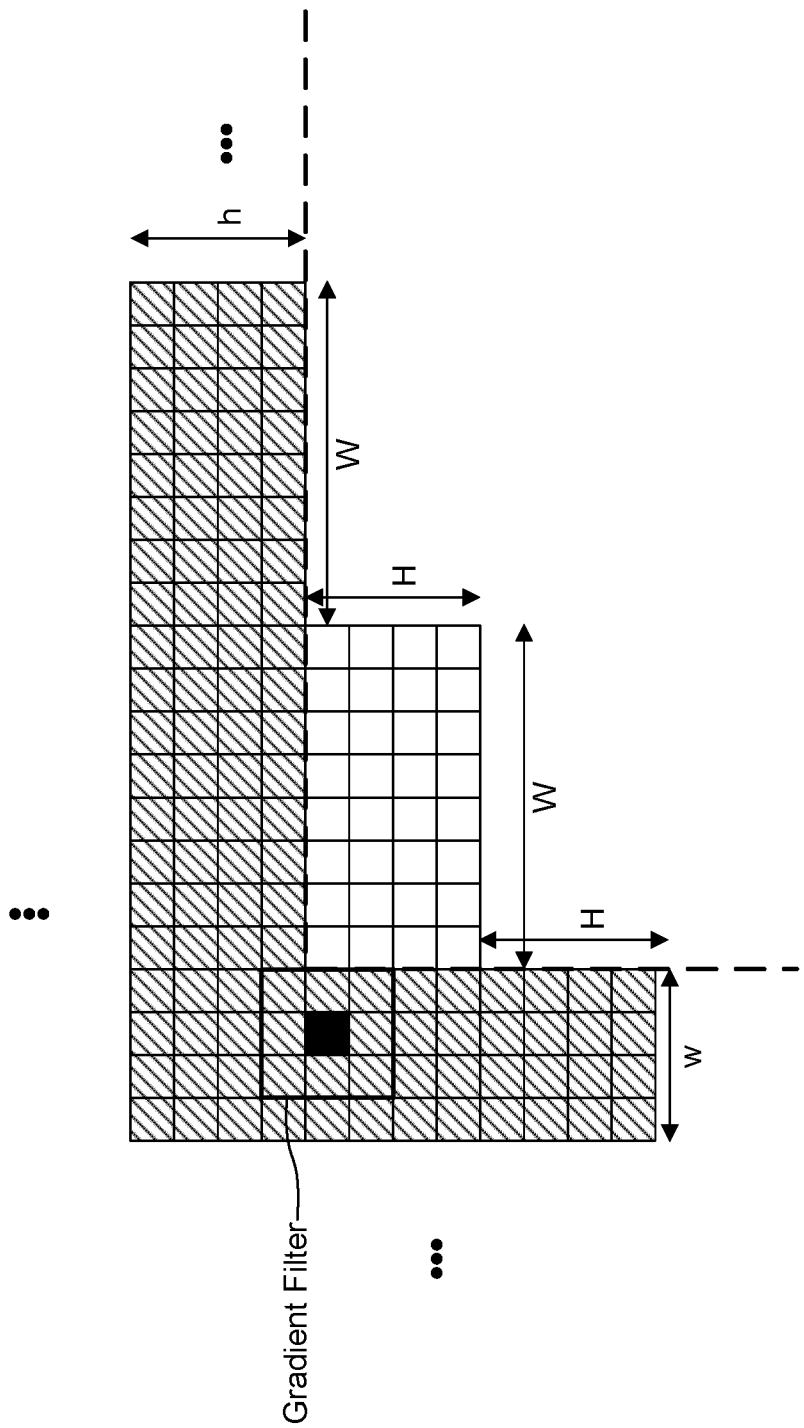
FIG. 13 illustrates extension of the DIMD context of a W×H block.

FIG. 13 illustrates extension of the DIMD context of a W×H block towards the above-right side of this block and its bottom-left side when, in the H rows on the bottom-left side of this block, all the decoded pixels are available and, in the W rows on the above-right side of this block, all the decoded pixels are available. The context is displayed in gray. The block is shown in white. The dashed black line delineates the frontier between the available decoded pixels and the unavailable ones. Here, H=4, W=8, h=w=4.

Figure 14:
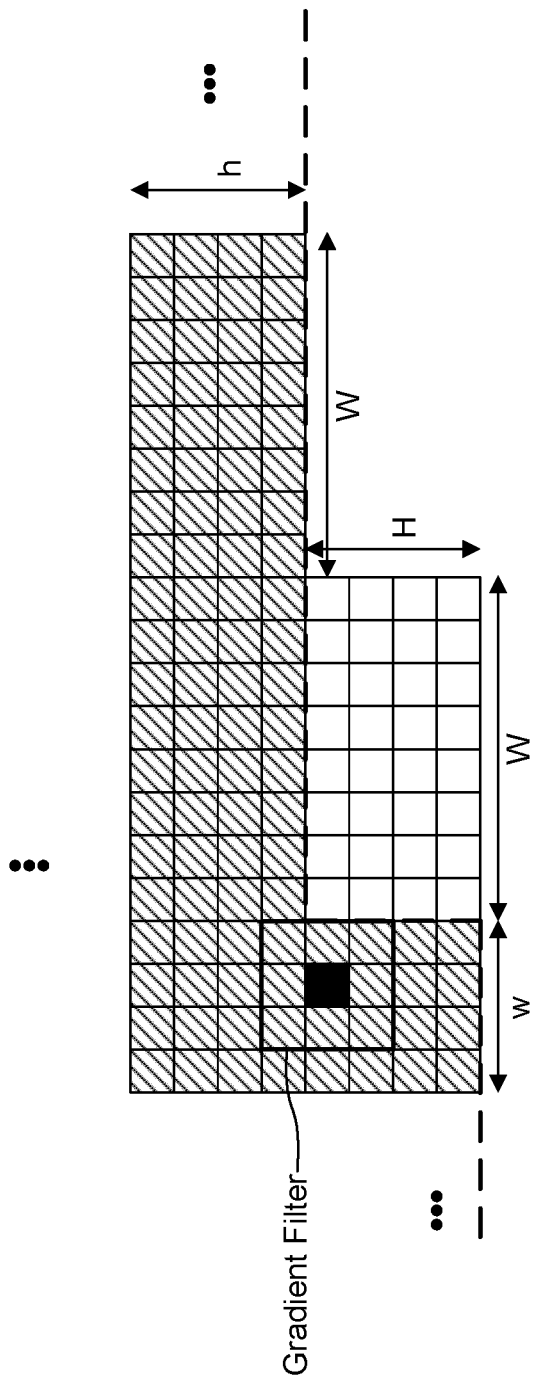
FIG. 14 illustrates extension of the DIMD context of a block under a first particular condition.

FIG. 14 illustrates extension of the DIMD context of a W×H block towards the above-right side of this block and its bottom-left side when, in the H rows on the bottom-left side of this block, none of the decoded pixels is available and, in the W rows on the above-right side of this block, all the decoded pixels are available. The context is displayed in gray. The block is shown in white. The dashed black line delineates the frontier between the available decoded pixels and the unavailable ones. Here, H=4, W=8, h=w=4.

Figure 15:
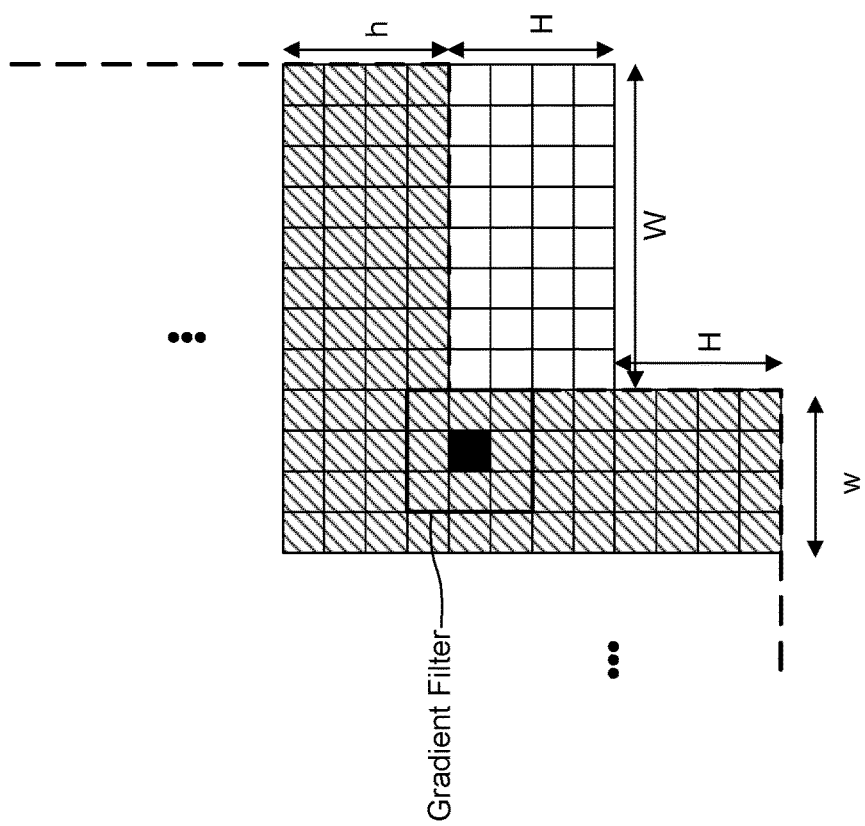
FIG. 15 illustrates extension of the DIMD context of a block under a second particular condition.

FIG. 15 illustrates extension of the DIMD context of a W×H block towards the above-right side of this block and its bottom-left side when, in the H rows on the bottom-left side of this block, all the decoded pixels are available and, in the W rows on the above-right side of this block, none of the decoded pixels is available. The context is displayed in gray. The block is shown in white. The dashed black line delineates the frontier between the available decoded pixels and the unavailable ones. Here, H=4, W=8, h=w=4.

Figure 16:
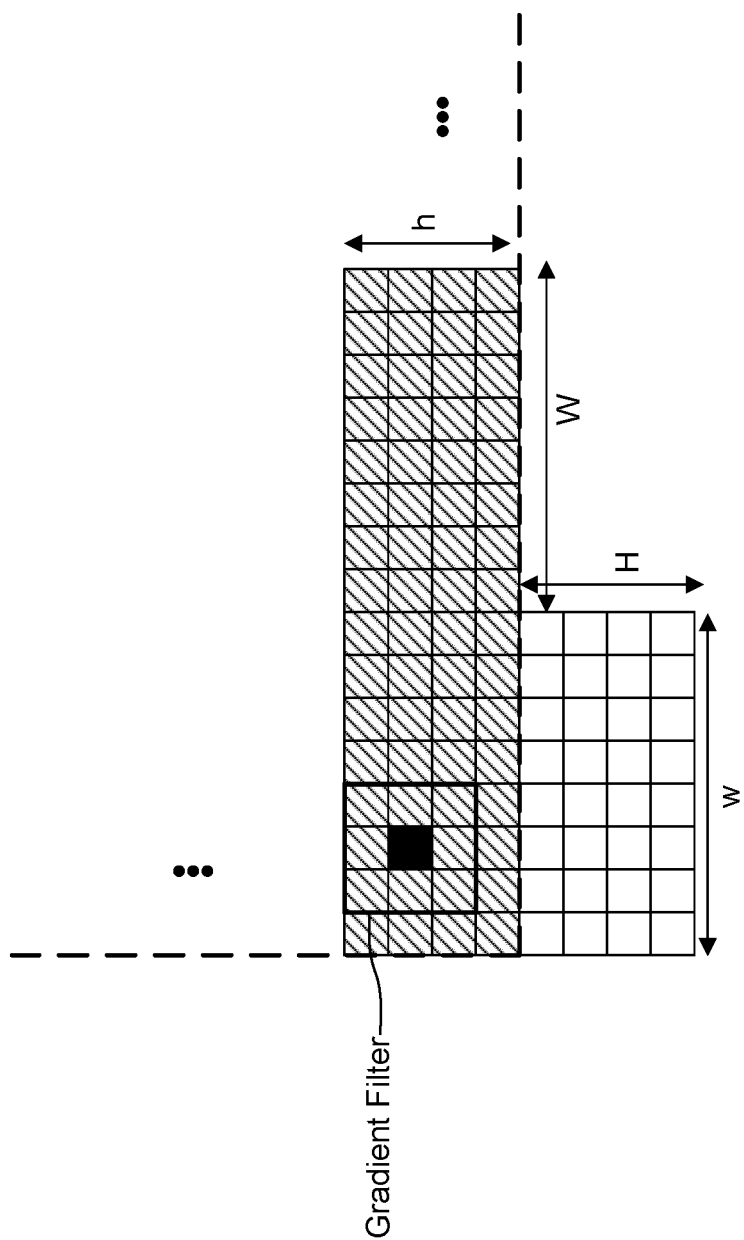
FIG. 16 illustrates extension of the DIMD context of a block under a third particular condition.

FIG. 16 illustrates extension of the DIMD context of a W×H block towards the above-right side of this block and its bottom-left side when, none of the decoded pixels on the left side of this block is available and, in the W rows on the above-right side of this block, all the decoded pixels are available. The context is displayed in gray. The block is shown in white. The dashed black line delineates the frontier between the available decoded pixels and the unavailable ones. Here, H=4, W=8, h=w=4.

Figure 17:
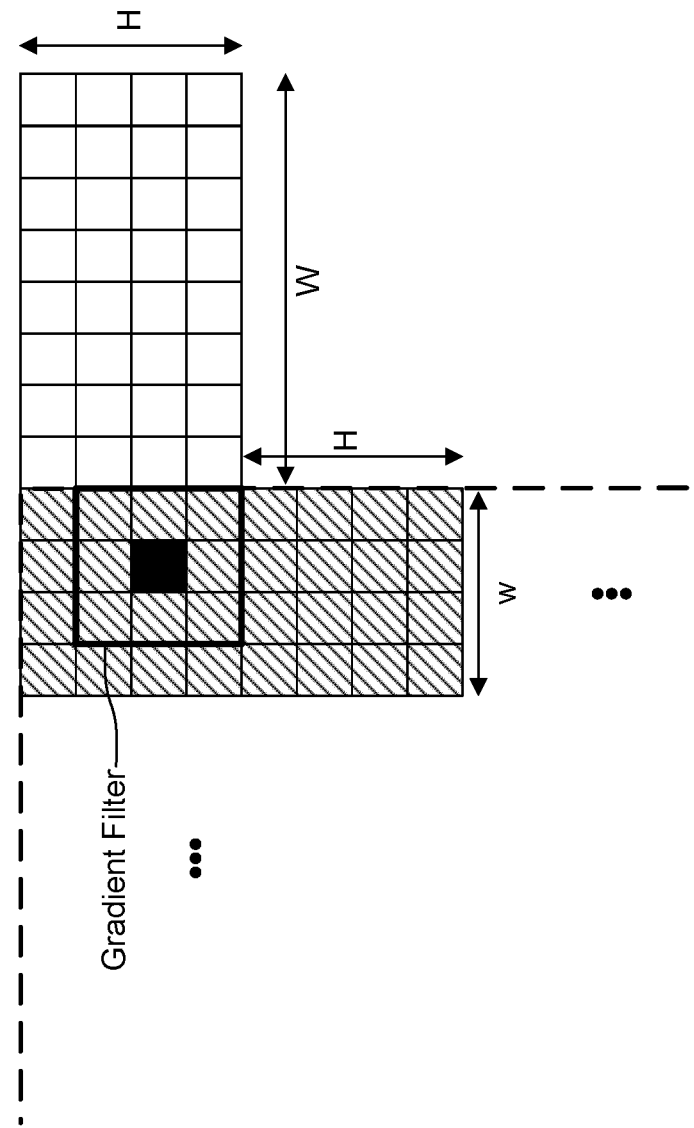
FIG. 17 illustrates extension of the DIMD context of a block under a fourth particular condition.

FIG. 17 illustrates extension of the DIMD context of a W×H block towards the above-right side of this block and its bottom-left side when, in the H rows on the bottom-left side of this block, all the decoded pixels are available and none of the decoded pixels above this block is available. The context is displayed in gray. The block is shown in white. The dashed black line delineates the frontier between the available decoded pixels and the unavailable ones. Here, H=4, W=8, h=w=4.

Thus, regarding the availability of the decoded reference pixels, the extraction of the DIMD context is comparable to the gathering of the decoded reference samples in VVC, except that the DIMD context contains w columns of decoded pixels on the left side of this block (instead of 1) and h rows of decoded pixels above this block (instead of 1). In this case, since, for a given W×H block to be predicted, the set of decoded reference samples is always included in the DIMD context, the decoded reference samples that will be used to perform the prediction of this block via the intra prediction mode(s) inferred by DIMD are necessarily involved in the computation of the gradients in DIMD. This ensures some consistency between the texture analysis in DIMD and the prediction via the intra prediction mode(s) inferred by DIMD.

In examples, unlike the gathering of the decoded reference samples in VVC, in the extraction of the DIMD context of the current block, there is no substitution of the unavailable decoded pixels. Indeed, at a substituted decoded pixel, the local gradients values may be skewed up by artificially introduced pixel values.

Figure 18:
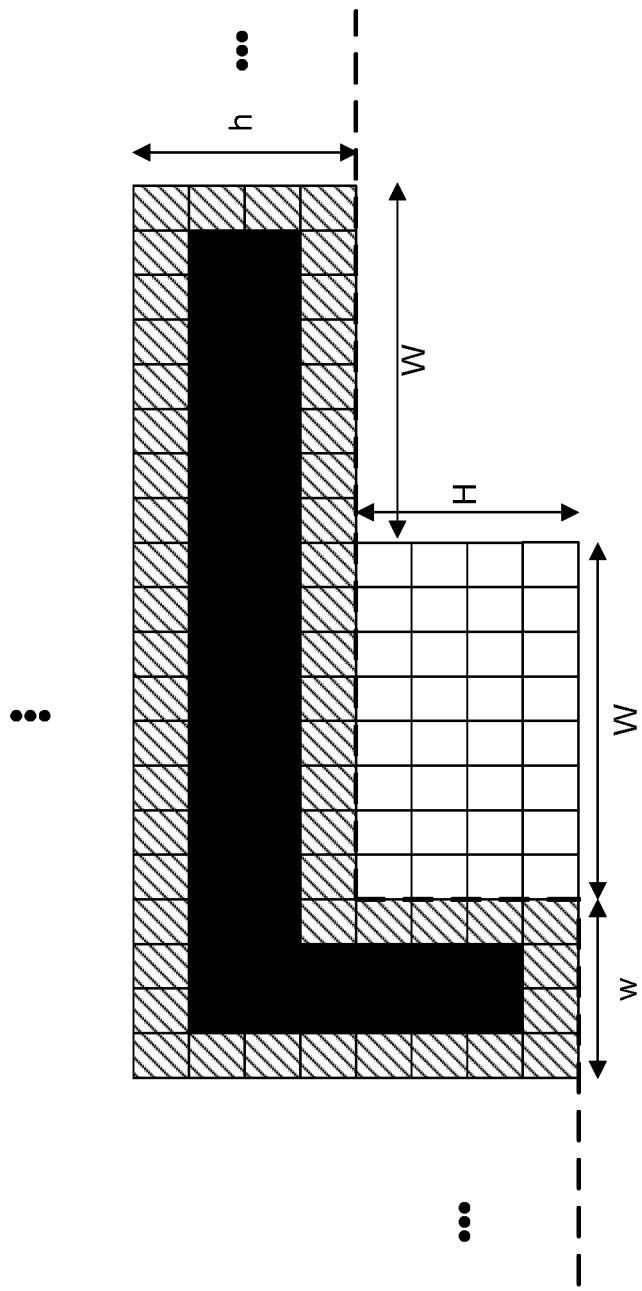
FIG. 18 illustrates extension of the DIMD context of a block under a fifth particular condition.

In examples, exclusively at an available decoded pixel, the local gradients are allowed to be computed, and their value can be used to increment a HOG bin. At an unavailable decoded pixel, no local gradient can be computed and none of the HOG bins are incremented for this unavailable decoded pixel. FIG. 18 shows, in the case of FIG. 14, using a 3×3 horizontal gradient filter and a 3×3 vertical gradient filter, at which available decoded pixels the local gradients are computed. That is FIG. 18 shows available decoded pixels in the DIMD context of a W×H block at which the local gradients are computed, which are filled in black. A 3×3 horizontal gradient filter and a 3×3 vertical gradient filter are used to compute the two local gradients at each decoded pixel filled in black. The available decoded pixels in gray belong to the DIMD context, but no local gradient is computed at them as the gradient filters would go out of the bounds of the DIMD context. Here, H=4, W=8, h=w=4.

Continuous Angle Discretization in DIMD

As explained above, in the case where $|G_{HOR}|=|G_{VER}|$, i.e., θ is equal to its maximum value, e.g., 65536 in the current implementation of ECM-2.0, θ̂ is considered as the closest to the maximum $A_i$. Thus, in the current implementation of ECM-2.0, i*=16.

Therefore, in the current implementation of ECM-2.0, if $|G_{HOR}|=|G_{VER}|$ and $G_{HOR}$ and $G_{VER}$ have the same sign, the target intra prediction mode index is 34. If $|G_{HOR}|=|G_{VER}|$ and $G_{HOR}$ and $G_{VER}$ have opposite signs, the target intra prediction mode index is 66.

The above-mentioned principle can be straightforwardly generalized to a different parametrization of the directional intra prediction modes DIMD can infer. For instance, if the number of directional intra prediction modes that DIMD can infer is increased from 65 to 129, the index of the horizontal mode becomes 34, that of the diagonal mode becomes 66, that of the vertical mode becomes 98, and that of the vertical diagonal mode becomes 130. Besides, the scaling in the conversion from θ to θ̂ must be adapted to the new parametrization and i∈[|0,32|]. In this case, this principle can be formulated as follows. In the case where $|G_{HOR}|=|G_{VER}|$, i.e. θ is equal to its maximum value, θ̂ is considered as the closest to the maximum $A_i \cdot i^*=32$. If $|G_{HOR}|=|G_{VER}|$ and $G_{HOR}$ and $G_{VER}$ have the same sign, the target intra prediction mode index is 66. If $|G_{HOR}|=|G_{VER}|$ and $G_{HOR}$ and $G_{VER}$ have opposite signs, the target intra prediction mode index is 130.

Figure 19:
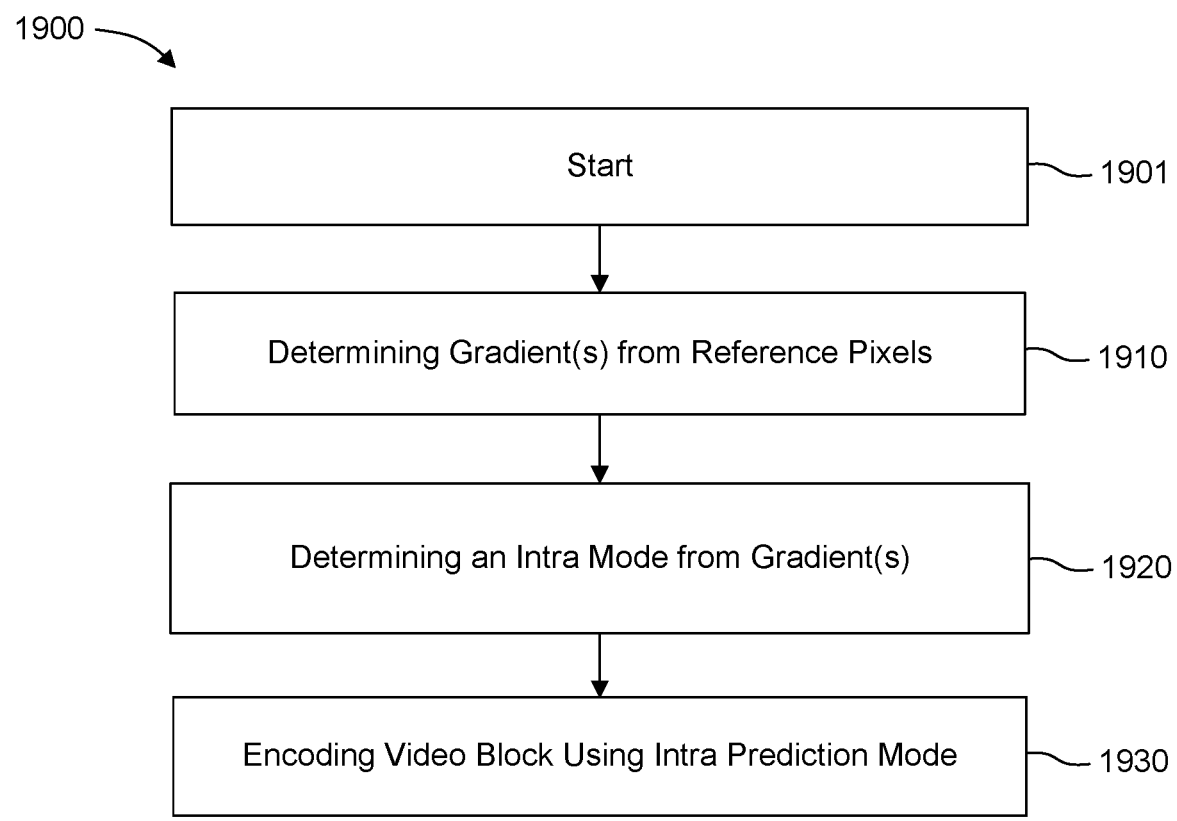
FIG. 19 illustrates one embodiment of a method for performing the described aspects.

One embodiment of a method 1900 under the general aspects described here is shown in FIG. 19. The method commences at start block 1901 and control proceeds to block 1910 for determining one or more gradients for reference pixels surrounding a current video block. Control proceeds from block 1910 to block 1920 for determining an intra prediction mode to use for encoding the current video block based on said gradients Control proceeds from block 1920 to block 1930 for encoding the current video block using the determined intra prediction mode.

Figure 20:
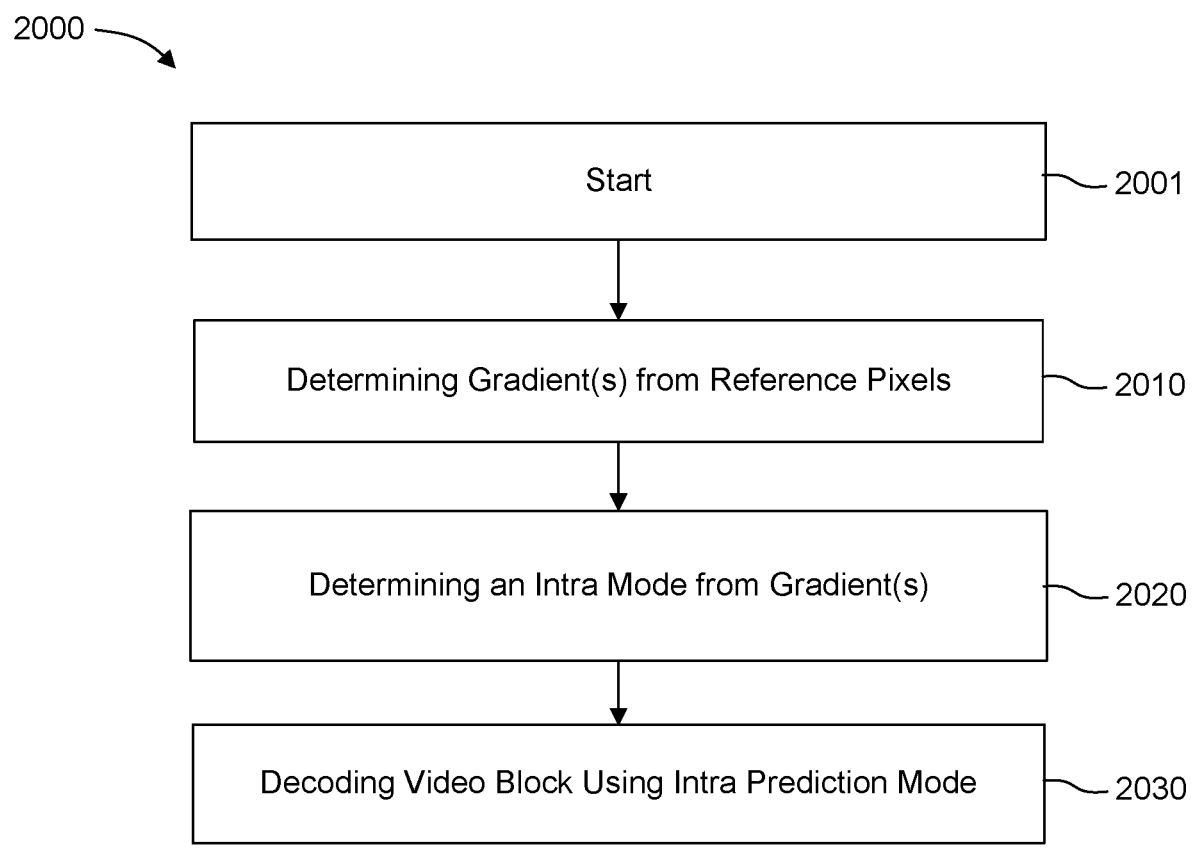
FIG. 20 illustrates another embodiment of a method for performing the described aspects.
Figure 21:
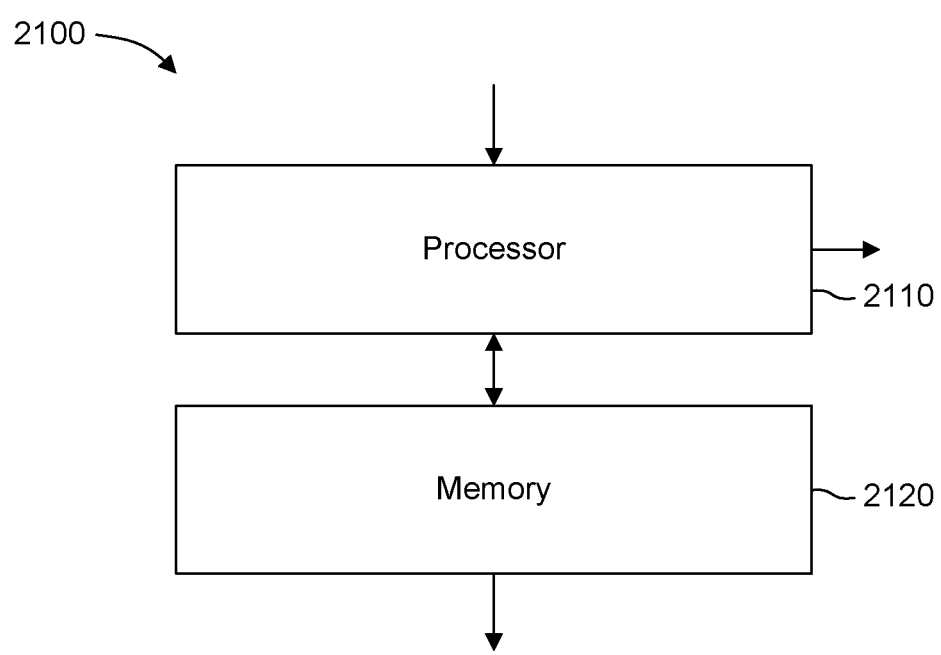
FIG. 21 illustrates one embodiment of an apparatus for implementing the described aspects.

One embodiment of a method 2000 under the general aspects described here is shown in FIG. 20. The method commences at start block 2001 and control proceeds to block 2010 for determining one or more gradients for reference pixels surrounding a current video block. Control proceeds from block 2010 to block 2020 for determining an intra prediction mode to use for decoding the current video block based on said gradients Control proceeds from block 2020 to block 2030 for decoding the current video block using the determined intra prediction mode.

FIG. 7 shows one embodiment of an apparatus 700 for encoding, decoding, compressing, or decompressing video data using extended reference area for decoder intra mode derivation. The apparatus comprises Processor 710 and can be interconnected to a memory 720 through at least one port. Both Processor 710 and memory 720 can also have one or more additional interconnections to external connections.

Processor 710 is also configured to either insert or receive information in a bitstream and, either compressing, encoding, or decoding using any of the described aspects.

The embodiments described here include a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 22:
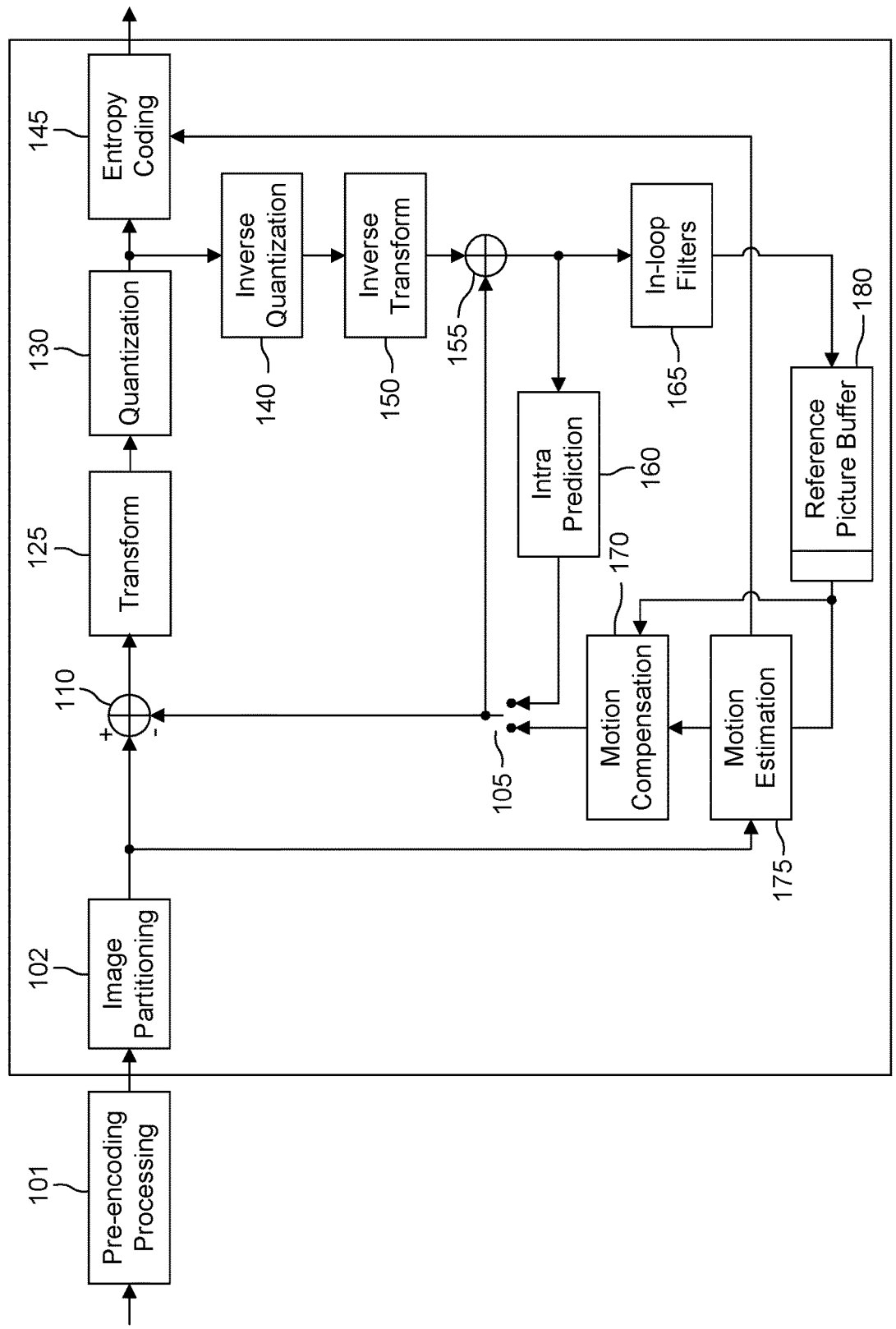
FIG. 22 illustrates a generic video encoding or compression system.
Figure 23:
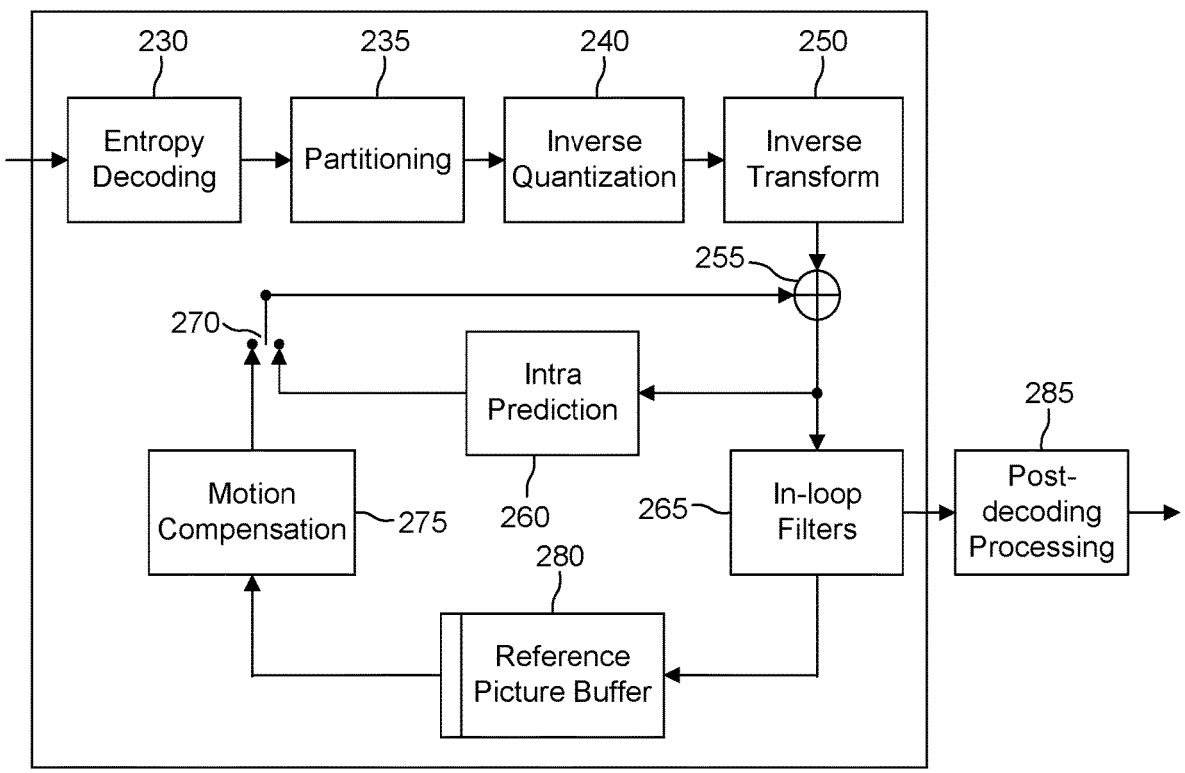
FIG. 23 illustrates a generic video decoding or decompression system.
Figure 24:
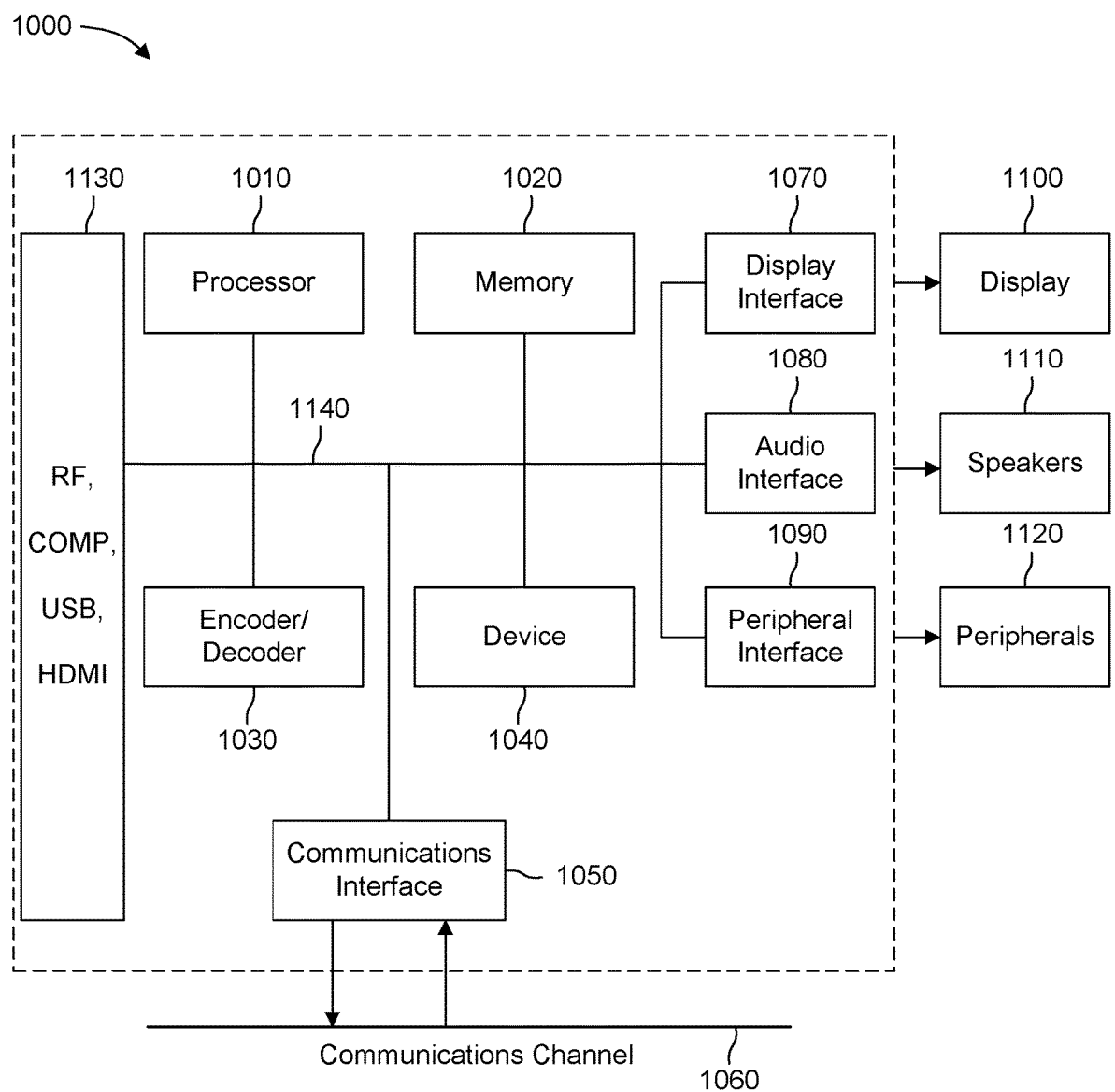
FIG. 24 illustrates a processor based system for implementing the described aspects.

The aspects described and contemplated in this application can be implemented in many different forms. FIGS. 22, 23, and 24 provide some embodiments, but other embodiments are contemplated and the discussion of FIGS. 22, 23, and 24 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra prediction, entropy coding, and/or decoding modules (160, 360, 145, 330), of a video encoder 100 and decoder 200 as shown in FIG. 22 and FIG. 23. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

FIG. 22 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 23 illustrates a block diagram of a video decoder 200. In the decoder 200, a bitstream is decoded by the decoder elements as described below. Video decoder 200 generally performs a decoding pass reciprocal to the encoding pass as described in FIG. 22. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g., conversion from YcbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 24 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 24, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface Ics or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or another device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments may refer to parametric models or rate distortion optimization. In particular, during the encoding process, the balance or trade-off between the rate and distortion is usually considered, often given the constraints of computational complexity. It can be measured through a Rate Distortion Optimization (RDO) metric, or through Least Mean Square (LMS), Mean of Absolute Errors (MAE), or other such measurements. Rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of transforms, coding modes or flags. In this way, in an embodiment the same transform, parameter, or mode is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

The preceding sections describe a number of embodiments, across various claim categories and types. Features of these embodiments can be provided alone or in any combination. Further, embodiments can include one or more of the following features, devices, or aspects, alone or in any combination, across various claim categories and types:

Using an extended area of reference pixels for decoder side intra mode derivation.

The above method wherein the extended area of reference pixels are used to perform gradients for each reference pixel.

The above method wherein the gradients are determined using two dimensional filters.

The above method wherein the filters do not use pixels outside the extended area of reference pixels.

Any of the above methods wherein the extended area of reference pixels extend one or more rows above, above right and above left of the current video block and one or more columns left, above left, and below left of the current video block.

A bitstream or signal that includes one or more syntax elements to perform the above functions, or variations thereof.

A bitstream or signal that includes syntax conveying information generated according to any of the embodiments described.

Creating and/or transmitting and/or receiving and/or decoding according to any of the embodiments described.

A method, process, apparatus, medium storing instructions, medium storing data, or signal according to any of the embodiments described.

Inserting in the signaling syntax elements that enable the decoder to determine decoding information in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs transform method(s) according to any of the embodiments described.

A TV, set-top box, cell phone, tablet, or other electronic device that performs transform method(s) determination according to any of the embodiments described, and that displays (e.g. using a monitor, screen, or other type of display) a resulting image.

A TV, set-top box, cell phone, tablet, or other electronic device that selects, bandlimits, or tunes (e.g. using a tuner) a channel to receive a signal including an encoded image, and performs transform method(s) according to any of the embodiments described.

A TV, set-top box, cell phone, tablet, or other electronic device that receives (e.g. using an antenna) a signal over the air that includes an encoded image, and performs transform method(s).

The invention claimed is:

1. A method, comprising:
   determining one or more gradients for available reference pixels surrounding a current video block;
   determining an intra prediction mode to use for encoding the current video block based on said gradients; and,
   encoding the current video block using the determined intra prediction mode, wherein when horizontal and vertical gradients are equal magnitude and same sign the intra prediction mode is 34, and when horizontal and vertical gradients are equal magnitude and opposite sign, the intra prediction mode is 66.

2. The method of claim 1, wherein said reference pixels comprise one or more rows above the current video block, one or more columns left of the current video block, pixels above and left of the current video block.

3. The method of claim 2 wherein said reference pixels further extend above and right of current video block and below left of said current video block.

4. The method of claim 1, wherein said gradients are determined using horizontal and vertical filters.

5. The method of claim 4 wherein said gradients are further determined using a convolution of said horizontal and vertical filters.

6. The method of claim 1, further comprising assigning an index to intra prediction mode.

7. The method of claim 1, wherein determination of said gradients uses reference pixels within a reference area.

8. The method of claim 1, wherein when the number of directional intra prediction nodes that DIMD can infer is increased from 65 to 129, an index of a horizontal mode becomes 34, that of a diagonal mode becomes 66, that of a vertical mode becomes 98, and that of a vertical diagonal mode becomes 130.

9. An apparatus, comprising:
   a processor, configured to perform:
   determining one or more gradients for available reference pixels surrounding a current video block;
   determining an intra prediction mode to use for encoding the current video block based on said gradients; and,
   encoding the current video block using the determined intra prediction mode, wherein when horizontal and vertical gradients are equal magnitude and same sign, the intra prediction mode is 34, and when horizontal and vertical gradients are equal magnitude and opposite sign, the intra prediction mode is 66.

10. The apparatus of claim 9, further comprising assigning an index to intra prediction mode and wherein said index is reassigned based on said index value.

11. The apparatus of claim 9, wherein when the number of directional intra prediction modes that DIMD can infer is increased from 65 to 129, an index of a horizontal mode becomes 34, that of a diagonal mode becomes 66, that of a vertical mode becomes 98, and that of a vertical diagonal mode becomes 130.

12. A method, comprising:
    determining one or more gradients for available reference pixels surrounding a current video block;
    determining an intra prediction mode to use for decoding the current video block based on said gradients; and,
    decoding the current video block using the determined intra prediction mode, wherein when horizontal and vertical gradients are equal magnitude and same sign, the intra prediction mode is 34, and when horizontal and vertical gradients are equal magnitude and opposite sign, the intra prediction mode is 66.

13. The method of claim 12, wherein when the number of directional intra prediction modes that DIMD can infer is increased from 65 to 129, an index of a horizontal mode becomes 34, that of a diagonal mode becomes 66, that of a vertical mode becomes 98, and that of a vertical diagonal mode becomes 130.

14. The method of claim 12, wherein said reference pixels comprise one or more rows above the current video block, one or more columns left of the current video block, pixels above and left of the current video block.

15. The method of claim 14 wherein said reference pixels further extend above and right of current video block and below left of said current video block.

16. An apparatus, comprising:
    a processor, configured to perform:
    determining one or more gradients for available reference pixels surrounding a current video block;
    determining an intra prediction mode to use for decoding the current video block based on said gradients; and,
    decoding the current video block using the determined intra prediction mode, wherein when horizontal and vertical gradients are equal magnitude and same sign, the intra prediction mode is 34, and when horizontal and vertical gradients are equal magnitude and opposite sign, the intra prediction mode is 66.

17. The apparatus of claim 16, wherein when the number of directional intra prediction modes that DIMD can infer is increased from 65 to 129, an index of a horizontal mode becomes 34, that of a diagonal mode becomes 66, that of a vertical mode becomes 98, and that of a vertical diagonal mode becomes 130.

18. A device comprising:
    an apparatus according to claim 16; and
    at least one of (i) an antenna configured to receive a signal, the signal including the coding unit, (ii) a band limiter configured to limit the received signal to a band of frequencies that includes the coding unit, and (iii) a display configured to display an output representative of a coding unit.

19. A non-transitory computer readable medium containing instructions which, when executed by a processor of a computer for video encoding, cause the computer to perform a plurality of operations including an operation according to the method of claim 1.

20. A non-transitory computer program product comprising instructions which, when the program is executed by a computer, cause the computer to carry out the method 3.

* * * * *